United States Patent [19]

Hwang

[11] 4,196,098
[45] Apr. 1, 1980

[54] PROCESS FOR PREPARING A POLYMERIZATION CATALYST

[75] Inventor: Yu-Tang Hwang, Clinton, Iowa

[73] Assignee: Chemplex Company, Rolling Meadows, Ill.

[21] Appl. No.: 694,780

[22] Filed: Jun. 10, 1976

[51] Int. Cl.² .................. B01J 21/04; B01J 21/08; B01J 23/26; B01J 31/12
[52] U.S. Cl. .................................. 252/430; 252/428; 252/429 R; 252/431 C; 252/458; 252/465; 252/467
[58] Field of Search .............. 252/428, 429 R, 430, 252/431 C, 458, 465, 467; 526/96, 350

[56] References Cited

U.S. PATENT DOCUMENTS

| | | | |
|---|---|---|---|
| 3,844,975 | 10/1974 | Karol | 252/430 |
| 3,953,413 | 4/1976 | Hwang et al. | 252/430 |

*Primary Examiner*—W. J. Shine
*Attorney, Agent, or Firm*—Wegner, Stellman, McCord, Wiles & Wood

[57] ABSTRACT

A new catalyst and method of making polymers therewith and the process of preparing the catalyst in which the catalyst is prepared by dispersing on a finely divided carrier material, particularly a difficultly reducible inorganic support such as silica, an organic chromiun (II) or (III) salt or derivative of a carboxylic acid or an N-substituted carboxylic acid or a nitrogen-heterocyclic carboxylic acid and activating the resulting mixture by heating at an elevated temperature in a non-oxidizing atmosphere.

18 Claims, No Drawings

PROCESS FOR PREPARING A POLYMERIZATION CATALYST

CROSS REFERENCE TO RELATED PATENT AND APPLICATION

The following patent and application are broadly concerned with somewhat similar catalysts:

Hwang & Grimmett U.S. Pat. No. 3,953,413 covering essentially chromium chelates of beta-dicarbonyl compounds as catalyst ingredients.

Hwang & Grimmett application Ser. No. 674,450, filed Apr. 7, 1976, which discloses modifying the catalyst support of U.S. Pat. No. 3,953,413 with zirconium.

The above patent and application are assigned to the assignee hereof.

SUMMARY OF THE INVENTION

In accordance with this invention, 1-olefins of 2 to 8 carbon atoms are polymerized or copolymerized with $C_2$–$C_{20}$ 1-olefins to form solid polymers or copolymers in the presence of the catalyst of this invention which comprises essentially low-valent chromium surface species, as an active ingredient, dispersed and supported on at least one difficult to reduce inorganic oxide.

The new and improved catalysts and methods of this invention are prepared by dispersing on a finely divided and difficult to reduce inorganic oxide selected from silica, alumina, thoria, zirconia, titania, magnesia and mixtures or composites thereof an organic chromium (II) or (III) salt or derivative of a carboxylic acid, an N-substituted carboxylic acid or a nitrogen-heterocyclic carboxylic acid to produce a mixture and then activating this mixture by heating to and at an elevated temperature up to about 2000° F. and preferably at a temperature that is within the range of 600°–2000° F. in a non-oxidizing atmosphere.

DESCRIPTION OF THE PREFERRED EMBODIMENTS

In accordance with this invention polymerizable olefinic compounds and especially 1-olefins of 2–8 carbon atoms are polymerized or copolymerized with $C_2$–$C_{20}$ 1-olefins to form solid polymers and copolymers in the presence of the novel catalyst which consists essentially of low-valent chromium (chromium (II) or (III) or mixed) surface species as an active ingredient dispersed and supported or fixed on at least one difficult to reduce carrier material such as an inorganic oxide and particularly a support of the class consisting of silica, alumina, thoria, zirconia, titania, magnesia and mixtures or composites thereof.

The organic chromium salts or compounds suitable for this invention, from which the above-mentioned low-valent chromium surface species are derived, include the chromium salts or derivatives of a carboxylic acid, an N-substituted alpha- or beta-aminocarboxylic acid or a nitrogen-heterocyclic carboxylic acid which contains at least four carbon atoms in each carboxylate group and is of the formula:

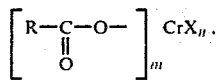

-continued

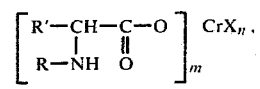

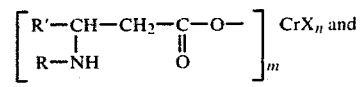

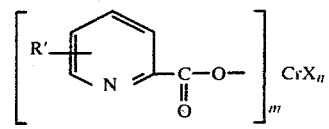

wherein R and R' are each selected from alkyl, alkenyl, aryl, cycloalkyl, cycloalkenyl and arylalkyl radicals and combinations of these radicals with each R containing 3–30 carbon atoms and each R' containing 0–20 carbon atoms and R' can be hydrogen and each R and R' containing a corresponding valence-satisfying number of hydrogen atoms, m is a whole number of 1 to 3, n is a whole bumber of 0 to 2 and m plus n is a whole number of 2 to 3, and X is a negative group relative to chromium. Typical chromium compounds of the above description are chromium pentanoate, chromium 2-ethylhexanoate, chromium benzoate, chromium oleate, chromium naphthenate, chromium derivative of N-phenylglycine, chromium derivative of picolinic acid, etc.

CATALYST PREPARATION

In preparing a catalyst of this invention, one normally takes a series of steps as follows, some of them being optional as indicated.

PRETREATMENT OF SUPPORT

Catalyst support, selected from silica, alumina, zirconia, thoria, magnesia, titania, or mixtures and composites thereof resulting from coprecipitation, impregnation, vapor-phase deposition, etc., may have surface area ranging from a few $m^2/g$ to over 700 $M^2/g$ but preferably above 150 $m^2/g$. Pore volume is preferably in excess of 0.5 cc/g if surface area is primarily related to micropores. A finely divided non-porous support with relatively high surface area such as "Cab-O-Sil" may also be used in this invention.

Although not required, pretreatment of the support prior to its impregnation with an appropriate organic chromium compound is often preferred. Such pretreatment typically consists of adjusting the moisture content of the support by drying at elevated temperatures or chemically modifying the support with compounds containing metallic elements such as zirconium, titanium, boron, vanadium, tin, molybdenum, magnesium, hafnium or the like. Chemical modification may include adding compounds such as ammonium hexafluorosilicate which can react with the support or with the organic chromium compound during activation. Chemical modification using metal alkyls which react with the support can also be used.

The chemically modified support, especially when involving the aqueous solution impregnation, is generally calcined at elevated temperatures to fix a modifier onto the support and also to expel an excess amount of moisture, much the same way as adjusting the moisture content in the unmodified support. The calcining or drying step is normally carried out at temperatures from 300° to 2000° F. and can be done by any process known in the art such as in a muffle furnace or in a heated fluidized bed using gases such as nitrogen, air, carbon monoxide or other suitable reactive or inert gases as fluidizing gases.

DISPERSION OF CHROMIUM CARBOXYLATE ON THE SUPPORT

The dispersion of a chromium carboxylate on the support can be readily accomplished by a conventional impregnation method using an organic solvent such as toluene or hexane. Equally satisfactory dispersion is often achieved by a more convenient method which calls for dry-blending of the carboxylate with the support and effecting the final dispersion during the initial stage of activation. If such a dry-blending technique is used, the subsequent activation is best carried out in the fluid bed operation. The optimum chromium content of the catalyst is dependent on the support type, surface area and pore structure. With a typical support whose surface area is 100–800 m$^2$/g and total pore volume is 0–3.0 cc/g, the chromium level may range from 0.05 to 10% with the preferred level somewhere around 0.1–2.0 weight percent on the dry basis.

THERMAL ACTIVATION OF THE CATALYST IN NON-OXIDIZING ATMOSPHERE

In accordance with this invention, the mixture of support and chromium carboxylate of this invention is heat activated in a non-oxidizing atmosphere at a temperature of from about 600°–2000° F. and preferably from about 850°–2000° F. The non-oxidizing atmosphere is provided either by inert gas such as nitrogen, helium, argon, etc., by reducing gas such as carbon monoxide, hydrogen, etc., or by evacuation to a sufficiently high vacuum. In the last case, it is desirable to permit deliberate leak-in of a small amount of non-oxidizing gas. In all cases, a mixture of non-oxidizing gases may be used, if desired.

When the activation is carried out in non-oxidizing (inert or reducing) gas atmosphere, either fluid-bed or stationary-bed operation may be used. Experience shows, however, that fluid-bed operation is preferable. Normally, for economic reasons, deoxygenated nitrogen is used to fluidize the catalyst in an activator. It was experimentally established that even a minute contamination of oxygen during the activation generally has a detrimental effect on catalyst activity, and that such an adverse effect is greatly magnified when the chromium level is reduced to about 0.15% from a more typical 1 weight percent, often to the extent of completely deactivating the catalyst.

The activation step is usually carried out using a preselected heating cycle which includes heating the catalyst up to a specific temperature, usually in the range of 600°–2000° F., holding the catalyst at this temperture for a prescribed length of time, usually 30 minutes to 12 hours, followed by cooling to ambient temperature in nitrogen atmosphere. The heating cycle may also include one or more hold periods at temperatures below the maximum, as mentioned above, to permit diffusion of moisture, solvent, or gaseous products from the catalyst pores, or to permit reactions such as decomposition of the surface organic chromium species to take place. The final activation temperature is usually selected on the basis of several factors such as desired resin properties, support type, pretreatment, etc. The heat-up rate above 600° F. is generally not critical.

The catalyst is preferably activated in a fluid bed using a non-oxidizing gas to maintain the mixture of support and chromium carboxylate under fluid condition while heating the mixture at about 300°–350° F. for from about 1 to 3 hours and then at about 550°–600° F. for about 1 to 3 hours to produce an interaction between the chromium compound and the support, followed by final activation at a temperature of about 850°–2000° F. for a period of about 0.5 to 12 hours.

POLYMERIZATION PROCESSES

The novel catalysts of this invention may be used in liquid-phase, solution or slurry processes or vapor-phase processes. In the liquid-phase operation, any $C_3$–$C_{12}$ saturated hydrocarbon may be used as a reaction medium or diluent. Other types of solvents, including aromatic hydrocarbons and chlorinated solvents, may also be used. The polymerization and copolymerization of 1-olefins may be carried out in batch or continuous process. The catalyst is generally charged into the reactor as a slurry in the continuous process, but as dry powder in the batch process. The mode of charging the solvent and olefin to the reactor system may follow any conventional practice applicable to batch or continuous operation, respectively. A vigorous agitation of the reaction medium is of course greatly preferred and so is the provision for efficient cooling to control the reactor temperature.

In liquid-phase processes, the olefin polymer or copolymer is normally recovered by flashing off solvent without any intervening steps for removal of the catalyst. The activity of the catalysts described in this invention is normally greater than 3000 pounds of polymer per pound of catalyst so that catalyst removal is unnecessary for practical purposes. Reactor conditions are dependent on the type of olefin as well as the desired polymer properties. In the case of ethylene, reactor pressures may range from 50 to 1000 psig, temperatures from 150° F. to 500° F. and solid levels from 5 to 60% by weight.

The following examples illustrate the invention.

EXAMPLE 1

A catalyst was prepared by the following steps:

1. 37.0 Grams of Davison 952 MS-ID silica gel, having about 350 m$^2$/g surface area and 1.70 cc/g total pore volume, was impregnated with 110 ml hexane solution containing 6.0 grams solvent-free chromium naphthenate.

2. The hexane was evaporated off at 85°–150° F. by nitrogen sweep until the catalyst became free flowing. This drying step always followed the impregnation using organic solvent and its mention will be omitted in the subsequent examples for simplicity.

3. About 15 grams of this impregnated and partially dried catalyst was charged into a catalyst activator consisting of a 38 mm O.D., 27 inch Vycor glass tube, fitted with a fritted disc in the mid-section of the tube for the purpose of fluidizing the catalyst and provided with tubular electrical heaters around the tube for adjusting the catalyst temperature. The catalyst was then fluidized with a flow of deoxygenated nitrogen, approximately 400 cc/min., and activated according to the following heating cycle: (a) held at 250° F. for one hour, (b) held at 350° F. for one hour, (c) held at 550° F. for one hour, (d) raised 200° F. every 15 minutes up to 950° F., (e) held at 950° F. for one hour, (f) raised 200° F. every 15 minutes up to 1700° F., (g) held at 1700° F. for 2 hours, and (h) cooled down to ambient temperature in a nitrogen atmosphere. The deoxygenated nitrogen used in this and subsequent examples was obtained by passing high purity nitrogen through a bed of reduced copper catalyst. 4. The catalyst thus activated was transferred into a closed flask equipped with a hose-and-clamp at both openings without exposing it to air. This step was also applicable to all the subsequent examples and its mention shall be omitted hereafter for simplicity.

Evaluation of the activated catalyst for its ethylene polymerization activity was carried out in accordance with a general procedure as follows. The reactor, essentially an autoclave 5" I.D. and about 12" deep, was equipped with an agitator rotating at 560 rpm, a flush bottom valve, and three ports for charging catalyst, isobutane and ethylene, respectively. The reactor temperature was controlled by a jacket containing methanol which was kept boiling by an electrical heater encircling the jacket. The control mechanism involved the automatic adjustment of jacket pressures in response to either cooling or heating requirements.

To test a catalyst, the reactor was first thoroughly purged with ethylene at temperatures around 200° F., followed by the transfer of 0.05-0.5 g catalyst from a catalyst flask under nitrogen into the reactor via a transfer tube without exposing it to air. After the catalyst charge port was closed, 2900 ml isobutane (dried and deoxygenated) was charged into the reactor, trapped ethylene was vented, and the reactor was allowed to warm up to 225° F. The reactor was then pressurized with ethylene which was regulated at 550 psig and which was permitted to flow into the reactor whenever the reactor pressure dropped below 550 psig. An instantaneous flow rate of ethylene was monitored by rotameters of various capacity. The duration of a test run was normally from 40 minutes to four hours depending on the polymerization rate or desired productivity.

As the end of a test run, ethylene flow was cut off, the flush bottom valve was opened, and the reactor content was dumped into a recovery pot, approximately 5" I.D. and 10" deep, where isobutane was allowed to flash off through a 200 mesh screen into the vent. Polymer particles left in the pot were recovered and weighed.

In this particular case, the activated catalyst was tested twice. The first run involved a catalyst charge of 0.1518 g, lasted for 60 minutes including an 8 minute induction period, and resulted in the recovery of 53 grams of polymer having the unmilled melt index of 0.44. In the second run, the catalyst charge was 0.1562 g, run time was 60 minutes including 5 minutes of induction, the polymer recovered weighed 65 grams, and the polymer melt index was 0.43.

EXAMPLES 2-4

In contrast to the compositionally complicated chromium naphthenate used in Example 1, these examples illustrate the invention with a simple chromium salt derived from a lower homolog of the monocyclic, saturated, monocarboxylic acids which are known to be the primary ingredients of commercially available naphthenic acids.

Chromium (III) cyclopentanecarboxylate used in these examples was prepared by the metathetical reaction between intermediate sodium cyclopentanecarboxylate and chromium trichloride in the aqueous medium. Specifically, 12 grams of cyclopentanecarboxylic acid was first dissolved in a 100 ml aqueous solution containing 4.1 grams NaOH. After the pH was adjusted to about 9, this solution was mixed with 50 ml of an aqueous solution containing 9.3 grams chromium trichloride, followed by heating and concentrating the resulting mixture to obtain the precipitate. The precipitate was then dissolved in 250 ml toluene and washed in solution with 100 ml water for several times. The insolubles were then filtered off and the chromium compound recovered by evaporation.

A catalyst was prepared by the following steps:

(1) about 10 pounds of Davison 952 MS-ID silica was dried in the pilot plant scale activator, essentially a 12" I.D. by 30" long cylinder equipped with a gas dispersing plate and encircling electrical heater. The actual drying was accomplished in the fluid bed maintained by 100 SCFH of air and held at 1300° F. for five hours.

(2) 30.0 Grams of this predried silica was then impregnated with 90 ml toluene solution containing 2.2 grams chromium cyclopentanecarboxylate obtained by the method described.

(3) The impregnated and partially dried catalyst was then activated in the Vycor tube activator as in Example 1 except for the heating cycle, which consisted of: (a) hold at 250° F. for one hour, (b) hold at 350° F. for one hour, (c) hold at 550° F. for one hour, (d) raise 200° F. every 15 minutes up to 1600° F., (e) hold at 1600° F. for 2 hours and (f) cool down to ambient temperatures.

According to the general testing procedure described in Example 1, the activated catalyst was tested three times and the following results were obtained:

| Exam. No. | Catalyst Charge, g | Run Time Min. | Polymer Recovered g. | Reactivity g/g/hr | Resin MI (unmilled) |
|---|---|---|---|---|---|
| 2 | 0.1718 | 60 | 91 | 529 | 0.36 |
| 3 | 0.1614 | 70 | 105 | 554 | 0.32 |
| 4 | 0.1880 | 60 | 86 | 457 | 0.40 |

EXAMPLE 5

This example is intended to demonstrate the applicability of the invention to unsaturated aliphatic carboxylates of chromium. Chromium oleate, selected as a representative compound of this group, was assayed to contain 4.5% chromium.

The catalyst was prepared by dispersing 8.0 grams of this chromium oleate onto 35.5 grams of the predried 952 MS-ID silica of Example 2. The dispersing was accomplished by solution impregnation using 105 ml. hexane. About 12 grams of this impregnated and partially dried catalyst was then activated in the same manner as Example 1 except the final hold temperature was 1600° F. instead of 1700° F.

The catalyst thus prepared was tested in accordance with the general procedure described in Example 1. For the catalyst charge of 0.1641 gram and run time of 60 minutes including five minutes of induction there was recovered 70 grams of polymer corresponding to a reactivity of 426 g/g cat/hr.

EXAMPLE 6

This example is intended to illustrate the chemical modification of the support prior to the dispersion of chromium carboxylate as well as to demonstrate the applicability of this invention to lower homologs of straight-chain carboxylates of chromium.

Chromium pentanoate used in this example was prepared by the metathetical reaction between intermediate sodium pentanoate and chromium trichloride in an aqueous medium. Specifically, 20 grams of valeric acid was first dissolved in 50 ml. aqueous solution containing 7.8 grams of sodium hydroxide. 17.4 grams of chromium trichloride dissolved in 50 ml. water was then added to the above solution followed by heating and evaporation of water to cause the precipitation of chromium pentanoate. After the mother liquor was removed, the precipitate was dissolved in acetone and the insolubles were eliminated by filtering. A green thick semi-solid was obtained after the solvent was evaporated.

The catalyst was prepared by the following steps:

(1) 400 Grams of Davison 952 MS-ID silica was impregnated with an aqueous solution prepared by dissolving 9.65 grams zirconium tetrachloride in 1200 ml demineralized water, followed by drying at 230° F. in an oven equipped with mechanical convection until free flowing. Afterward, the temperature was raised to 400° F. and kept there for 4 hours in the same oven.

(2) This zirconium tetrachloride-modified silica was then calcined in a muffle furnace by a heating cycle consisting of (a) hold at 400° F. for one hour, (b) raising 90° F. every 15 minutes up to 1200° F., (c) hold at 1200° F. for 4 hours, and (d) cool down to room temperature.

(3) 30.0 Grams of this zirconium-modified silica was then impregnated with a 90 ml acetone solution containing 2.1 grams of chromium pentanoate obtained by the method just described.

(4) About 15 grams of this impregnated and partially dried catalyst was activated by the method described in Example 2 except that the final hold temperature was 1750° F. instead of 1600° F.

The activated catalyst was evaluated in accordance with the general procedure described in Example 1. By charging 0.2494 g catalyst and terminating the run after 60 minutes, 128 grams of polymer was obtained showing a resin melt index of 0.60 ( on an unmilled sample).

EXAMPLES 7-9

These examples further illustrate a possible variation in preparing the catalyst of this invention. Free acid in a small quantity is often found in a commercial chromium carboxylate sample, but may also be added as a solvent for a given carboxylate, sometimes in excess of 50%. Two grades of commercial chromium 2-ethylhexanoate represented such a situation.

In Example 7, a catalyst was prepared by impregnating 450 grams of the predried 952 MS-ID silica of Example 2 with a 1200 ml hexane solution containing 42 grams of chromium 2-ethylhexanoate which was analyzed to contain 10.8% chromium. About 15 grams of this impregnated and partially dried catalyst was then activated by the method of Example 2 except the final hold temperature was 1700° F. instead of 1600° F.

In Examples 8 and 9, a catalyst was prepared by impregnating 30.0 grams of the predried 952 MS-ID silica of Example 2 with a 90 ml hexane solution containing 2.8 grams of chromium 2-ethylhexanoate, the same material as used in Example 7, and 2.8 grams of free 2-ethylhexanoic acid. The activation of the resulting catalyst was exactly the same as in Example 7.

Test results of these catalysts, by the general method of Example 1, was summarized as follows:

| Exam. No. | Catalyst Charge, g | Run Time Min. | Polymer Recovered g. | Reactivity g/g/hr | Resin MI (unmilled) |
|---|---|---|---|---|---|
| 7 | 0.2010 | 60 | 64 | 318 | 0.47 |
| 8 | 0.1754 | 60 | 42 | 241 | 1.13 |
| 9 | 0.1608 | 60 | 58 | 361 | 1.99 |

Generally speaking, the presence of the free acid shows no significant effects on activity but may have some effects on the properties of the resulting polymer.

EXAMPLE 10

This example demonstrates the applicability of this invention to a chromium salt of aromatic carboxylic acid.

Chromium benzoate used in this example was prepared by the metathetical reaction between sodium benzoate and chromium trichloride in the aqueous medium. Specifically, 25 grams of sodium benzoate dissolved in 150 ml of water was mixed with 15.4 grams of chromium trichloride in a 50 ml solution, followed by heating to precipitate a blue solid. After washing with 500 ml water, the precipitate was dissolved in 300 ml dichloromethane for removal of insolubles. The filtrate was concentrated to form a resin-like material which was readily ground to a blue powder.

A catalyst was prepared by first dissolving 2.4 grams of the above chromium benzoate in 90 ml dichloromethane. This solution was then used to impregnate 30.0 grams of the predried 952 MS-ID silica of Example 2. About 15 grams of this impregnated and partially dried catalyst was activated by the same method as in Example 2. The catalyst thus activated was tested according to the general method described in Example 1. For a catalyst charge of 0.2067 g and a run time of 60 minutes, 11 grams of polymer were recovered.

EXAMPLE 11

This example demonstrates the applicability of the invention to chromium salts of N-substituted alpha-aminoacids, which is typified by N-phenylglycine ($PhNHCH_2COOH$).

The chromium (III) derivative of N-phenylglycine used in this example was prepared by heating a mixture of 3.2 grams of sodium hydroxide, 12 grams of N-phenylglycine and 7.0 grams of chromium trichloride in a 150 ml aqueous solution. The bluish-grey precipitate was washed with water and dissolved in 240 ml acetone for the removal of the insolubles. The partially purified chromium compound was recovered by evaporating the solution to dryness.

A catalyst was prepared by impregnating 30.0 grams of the predried 952 MS-ID silica of Example 2 with a 90 ml acetone solution containing 3.0 grams of the above chromium derivative of N-phenylglycine. About 20 grams of this impregnated catalyst was activated essentially by the same method as in Example 2.

Tested twice according to the general method described in Example 1, the activated catalyst yielded the results as follows. For the catalyst charge of 0.1985 and 0.1963, 74 and 70 grams of polymer, respectively, were recovered each over a 60 minute run. Their reactivities were calculated to be 373 and 356 g/g/hr and their resin melt indices were 0.33 and 0.38, respectively.

EXAMPLE 12

This example further demonstrates the applicability of the invention to a chromium derivative of nitrogen-heterocyclic carboxylic acids such as picolinic acid

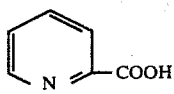

The chromium derivative of picolinic acid used in this example was prepared as follows. A 100 ml aqueous solution containing 20 grams of picolinic acid and 6.5 grams of sodium hydroxide was added to 14.4 grams of chromium trichloride dissolved in 50 ml water. The red precipitate, formed on heating the solution, was washed with water, rinsed with acetone, and dried over mild heat.

1.3 Grams of this ground chromium derivative of picolinic acid was blended with 15.0 grams of the predried MS-ID silica of Example 2. The mixture was charged into the Vycor tube activator described in Example 1 and the activation of the catalyst was carried out in the same manner as in Example 2. Following the general test procedure described in Example 1, the catalyst was tested twice attaining reactivities of 587 and 534 g/g/hr, respectively.

Having described my invention as related to the embodiments set out herein, it is my intention that the invention be not limited by any of the details of description, unless otherwise specified, but rather be construed broadly within its spirit and scope as set out in the appended claims.

I claim:

1. The process of preparing an active polymerization catalyst comprising the steps of initially mixing with a finely divided, difficultly reducible, inorganic support selected from the group consisting of silica, alumina, thoria, zirconia, titania, magnesia, and mixtures and composites thereof a chromium carboxylate containing at least four carbon atoms in each carboxylate group and essentially of the formula selected from the group consisting of

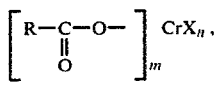

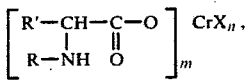

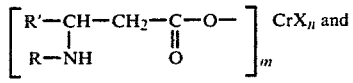

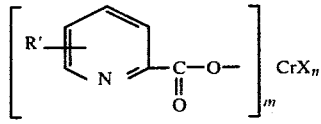

wherein R and R' are each selected from the group consisting of alkyl, alkenyl, aryl, cycloalkyl, cycloalkenyl and arylalkyl radicals and combinations of these radicals with each R containing 3-30 carbon atoms and each R' containing 0-20 carbon atoms and R' can be hydrogen and each R and R' containing a corresponding valence-satisfying number of hydrogen atoms, m is a whole number of 1 to 3, n is a whole number of 0 to 2 and m plus n is a whole number of 2 to 3, and X is a negative group relative to chromium, and activating the resulting mixture by heating to and at an elevated temperature of from about 600°-2000° F. in a non-oxidizing atmosphere.

2. The process of claim 1 wherein said chromium carboxylate is essentially of the formula

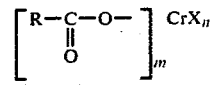

3. The process of claim 1 wherein said chromium carboxylate is essentially of the formula

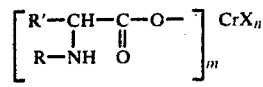

4. The process of claim 1 wherein said chromium carboxylate is essentially of the formula

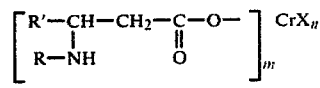

5. The process of claim 1 wherein said chromium carboxylate is essentially of the formula

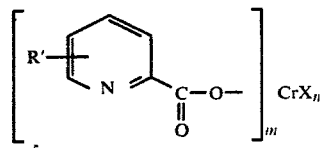

6. The process of claim 1 wherein said support prior to the addition of said chromium carboxylate is pretreated by heating at a temperature of from about 300°-2000° F. until volatile matter is at least partially driven off.

7. The process of claim 1 wherein said chromium carboxylate is dissolved in a solvent and the resulting solution used to impregnate said support.

8. The process of claim 1 wherein said dispersing of said chromium carboxylate is accomplished by dry blending with said finely divided support followed by heating the mixture in a fluid bed maintained in suspension with a non-oxidizing gas flowing through said support during said heating.

9. The process of claim 1 wherein said catalyst on a dry basis contains an amount of said chromium carboxylate to provide about 0.05-10 wt.% of chromium.

10. The process of claim 1 wherein said chromium carboxylate is selected from the group consisting of chromium pentanoate, chromium 2-ethylhexanoate, chromium benzoate, chromium oleate, chromium naphthenate, chromium derivative of N-phenylglycine and chromium derivative of picolinic acid.

11. The process of claim 1 wherein said catalyst activation is carried out in a fluid bed maintained by the flow of a non-oxidizing gas.

12. The process of claim 1 wherein said catalyst activation is carried out in a stationary bed in a non-oxidizing atmosphere provided by evacuation of any gases from said bed.

13. The process of claim 1 wherein said catalyst activation is carried out in a stationary bed in a non-oxidizing atmosphere provided by a non-oxidizing gas.

14. The process of claim 11 wherein said non-oxidizing gas is selected from the group consisting of nitrogen, hydrogen, carbon monoxide, inert gases and mixtures of these gases.

15. The process of claim 1 wherein said catalyst activation is carried out in a fluid bed using a non-oxidizing gas to maintain the mixture of support and chromium carboxylate in suspension while heating said mixture to a final activation temperature of from 850°–2000° F.

16. The process of claim 13 wherein said non-oxidizing gas is selected from the group consisting of nitrogen, hydrogen, carbon monoxide, inert gases and mixtures of these gases.

17. The process of claim 1 wherein said catalyst activation is carried out in a fluid bed using a non-oxidizing gas to maintain the mixture of support and chromium carboxylate in a fluid condition while heating said mixture at about 300°–350° F. for from about 1 to 3 hours and then at about 550°–600° F. for about 1 to 3 hours to produce an interaction between the chromium compound and the support, followed by final activation at a temperature of about 850°–2000° F., for a period of between about 0.5–12 hours.

18. The process of claim 17 wherein said non-oxidizing gas is selected from the group consisting of nitrogen, hydrogen, carbon monoxide, inert gases and mixtures of these gases.

* * * * *